(12) United States Patent
Cheng et al.

(10) Patent No.: US 7,142,421 B2
(45) Date of Patent: Nov. 28, 2006

(54) DOCKING STATION FOR LOCKING A NOTEBOOK COMPUTER

(75) Inventors: Yao-Kun Cheng, Taipei (TW); Chih-Chin Yu, Taipei (TW)

(73) Assignee: Inventec Corporation (TW)

( * ) Notice: Subject to any disclaimer, the term of this patent is extended or adjusted under 35 U.S.C. 154(b) by 20 days.

(21) Appl. No.: 11/022,876

(22) Filed: Dec. 28, 2004

(65) Prior Publication Data

US 2006/0139875 A1     Jun. 29, 2006

(51) Int. Cl.
*G06F 1/16* (2006.01)
*B41J 3/36* (2006.01)

(52) U.S. Cl. ................... 361/686; 248/917; 400/88; 439/929

(58) Field of Classification Search ........ 361/679–687, 361/724–727; 248/552, 917–922; 400/88; 439/131, 374, 929
See application file for complete search history.

(56) References Cited

U.S. PATENT DOCUMENTS

| 6,231,371 | B1 * | 5/2001 | Helot ................... 439/374 |
| 2004/0120112 | A1 * | 6/2004 | Mullen et al. ............. 361/686 |
| 2006/0024107 | A1 * | 2/2006 | Lyman et al. ............. 400/88 |

\* cited by examiner

*Primary Examiner*—Hung Van Duong
(74) *Attorney, Agent, or Firm*—Bacon & Thomas PLLC

(57) ABSTRACT

The present invention discloses a docking station for locking a notebook computer, of which the docking station not only can expand the functions of a notebook computer to those of a desktop computer, but also can lock the notebook computer to prevent it from being taken away or stolen, and the docking station can further integrate another lock device as to lock the notebook and the docking station together as to provide a multiple of effects for preventing the notebook, the docking station, or both from being taken away or stolen.

6 Claims, 4 Drawing Sheets

DOCKING STATION FOR LOCKING A NOTEBOOK COMPUTER

FIELD OF THE INVENTION

The present invention relates to a docking station, more particularly to a docking station capable of expanding the functions of a notebook computer to those similar to a desktop computer as well as locking the notebook computer to prevent it from being taken away or stolen.

BACKGROUND OF THE INVENTION

For those who have experience on using a notebook computer before, regardless of using it in an office or at home, one has to connect many cables and peripherals such as a power cable, a network cable, a mouse, a printer and a speaker, etc. If users need to take the notebook computer out with them, it will be quite annoying to remove all the cables and peripherals, without mentioning the reinstallation of these cables and peripherals when the users bring it back to the office or home.

To solve this annoying problem, a multifunctional docking station is designed for notebook computers to provide an easy way of installing and removing peripherals. There are three main types of multifunctional docking stations: a basic model with several peripheral connection ports; an expanded model having a multibay individually installed on both sides of the docking station for installing additional computer peripherals in addition to the foregoing connection ports, so that the functions of a notebook computer can be expanded almost up to the functions of a desktop computer; and an external docking station model using a universal serial bus (USB) interface for connecting a notebook computer.

Further, the size of a notebook computer is limited, and even the so-called "all-in-one" model cannot accommodate too many storage devices into the limited space provided by a notebook computer, particularly the space for the installation of hard disk drives is very limited. After a user has used a computer for a while, the quantity of data will become larger and larger, and thus it is necessary to add another hard disk drive or back up the data by a CD burner. Of course, data can be transmitted through the local area network for the data processing, but it is not as convenient to save and access data directly into/from the computer. Therefore, the foregoing multibay can provide a more flexible way of storing data, and the peripherals connected to the multibay can expand the functions of the notebook computer, such as installing another detachable hard disk drive, CD burner, DVD-ROM, floppy disk drive, and the like, or even adding another battery to improve the battery time or using the notebook interchangeably with a commercial desktop computer.

The so-called "expandable mobile architecture" refers to the concept derived from the aforementioned principles and emphasizes on its powerful expandability, so that users can easily expand the desired functions for their notebook computers. The multibay allows a hot plug connection for various different peripherals and integrates different platforms to meet different requirements, and thus can make the installation of external devices to the notebook computer easy.

However, after a notebook computer is installed onto a docking station, the notebook computer can be taken away by someone else very easily, since the traditional docking station usually does not come with the design of a special locking mechanism. Even if there is a locking mechanism, the mechanism is so complicated that incurs a high cost. Furthermore, such locking mechanism usually cannot be combined with the docking station itself, and thus the notebook computer and the docking station will be taken away altogether, even though it is difficult to take away the notebook computer only. Such design causes more damages to users, and thus finding a way to overcome the foregoing shortcomings is an urgent and important topic for manufactures.

SUMMARY OF THE INVENTION

In view of the detailed description above, it is obvious that the multifunctional docking station in accordance with the present invention is derived from the expandable mobile architecture, but there is no special design for the locking mechanism and thus the notebook computer or even both of the notebook computer and the docking station may be taken away easily or stolen after the notebook computer is installed onto the docking station. Such arrangement has the drawback of causing more damages to users. Therefore, the inventor of the present invention based on years of experience on the related field and the actual requirements of the market and users to conduct extensively researches and experiments as to overcome the foregoing problems, and finally invented a docking station for locking a notebook computer in hope of contributing this innovative idea to the general public.

Therefore, it is a primary objective of the present invention to provide a docking station for locking a notebook computer, and the body of the docking station comprises a lock device and a release button being controlled by the lock device for its press-down movement, so that a connector and two latch holes disposed at the bottom of the notebook computer are precisely connected and engaged into another connector and the hooks are disposed on the holder when a notebook is installed onto a holder of the docking station. When the notebook computer is released from the holder, users just need to press the release button to prop the bottom of the notebook computer while turning the hooks outward and separating it from the latch holes as to protect and prevent the connector of the holder, the other connector, related circuits and contact points from being shaken or damaged by improper human errors occurred when the notebook computer is connected or detached from the docking station.

Another objective of the present invention is to provide a docking station for locking a notebook computer, wherein the release button is controlled by the lock device and its related locking mechanism, not only can lock a notebook computer to the holder of a docking station, but also can integrate another lock device (such as a cable lock) on the body of the docking station to lock the notebook and the docking station together and thus achieving a multiple of effects when other lock devices are incorporated.

The above and other objects, features and advantages of the present invention will become apparent from the following detailed description taken with the accompanying drawings.

DETAILED DESCRIPTION OF THE PREFERRED EMBODIMENTS

Figure 1:
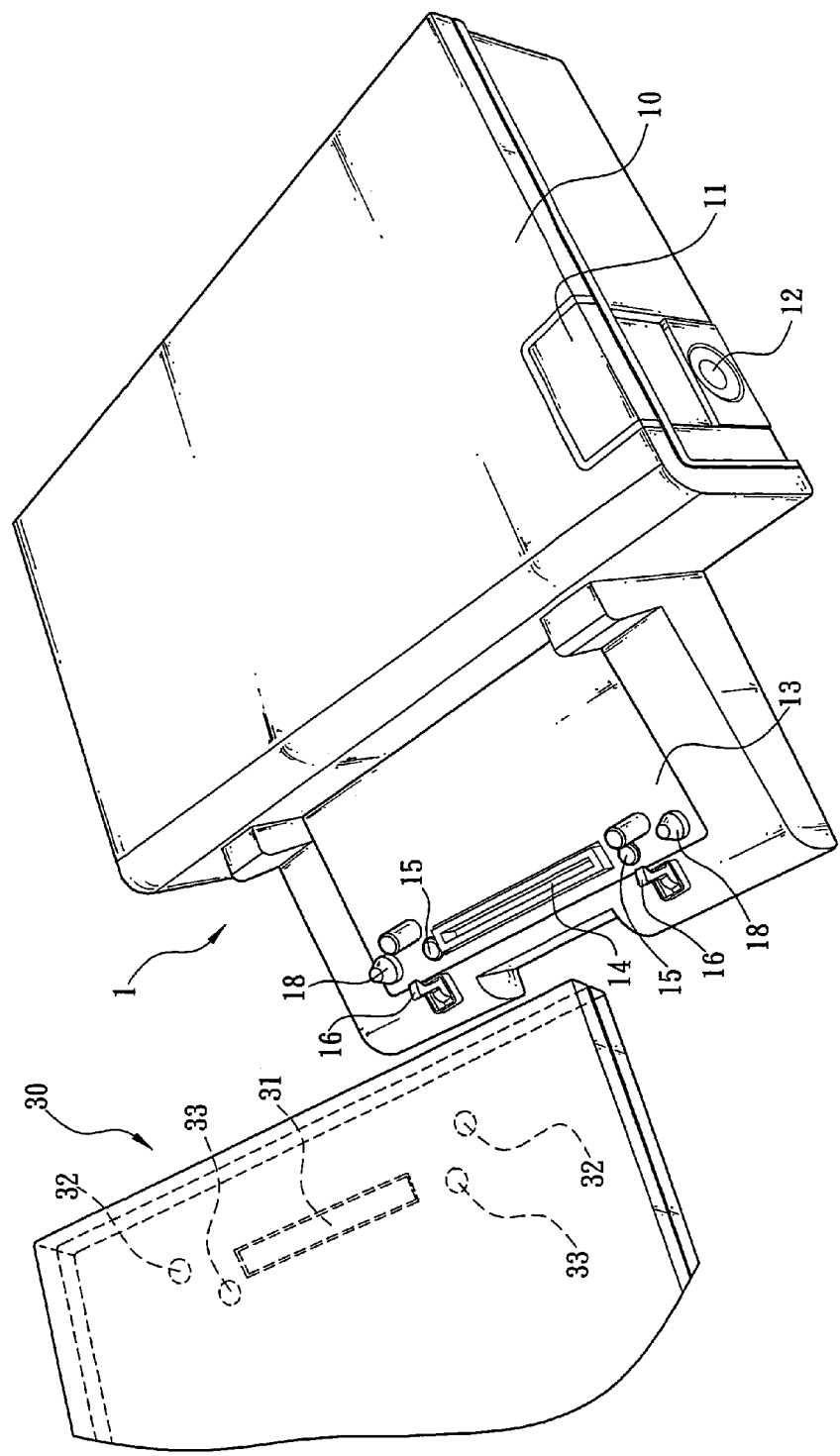
FIG. 1 is a schematic view of a docking station and a notebook according to the present invention.

Please refer to FIG. 1 for the docking station for locking a notebook computer in accordance with the present invention. In FIG. 1, a docking station 1 is provided for installing a notebook computer 30 thereon, and the docking station comprises a body 10, and the body 10 has a release button 11 and a lock device 12. The release button 11 is controlled by the lock device 12 for its press-down movement, and the body 10 has a holder 13 disposed on a side and the holder 13 has a connector 14 disposed thereon, both ends of the connector 14 individually have a vertically movable pillar body 15 and outwardly turnable hook 16.

The notebook computer 30 has another connector 31 at its bottom, and both ends of this connector 31 have a latch hole 33, so that the latch hole 33 can be engaged precisely with the hook 16 after the notebook computer 30 is installed onto the holder 13, and said other connector 31 and the connector 14 can be securely coupled with each other. When the release button 11 is pressed, the pillar body 15 props at the bottom of the notebook computer 30 while the hooks 16 are turned outward and separated from the latch holes 33 as to easily separate the connector 14 of the holder 13 and said other connector 31. Therefore, such arrangement protects the connector 14 of the holder 13, said other connector 31, and their related circuits or contact points from being shaken and damaged by improper human errors when the notebook computer is connected or detached.

Figure 2:
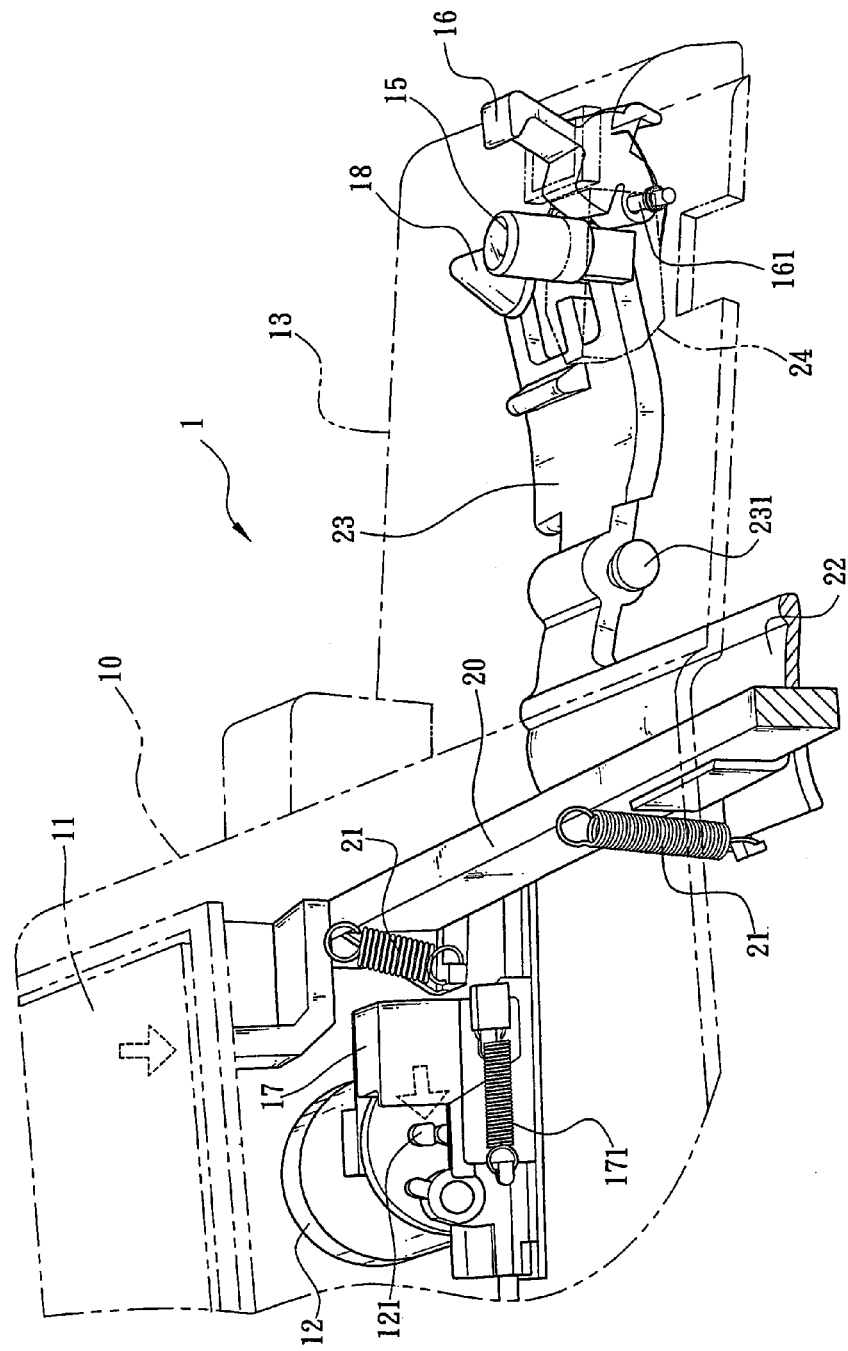
FIG. 2 is a perspective view of part of the docking station according to the present invention.
Figure 3:
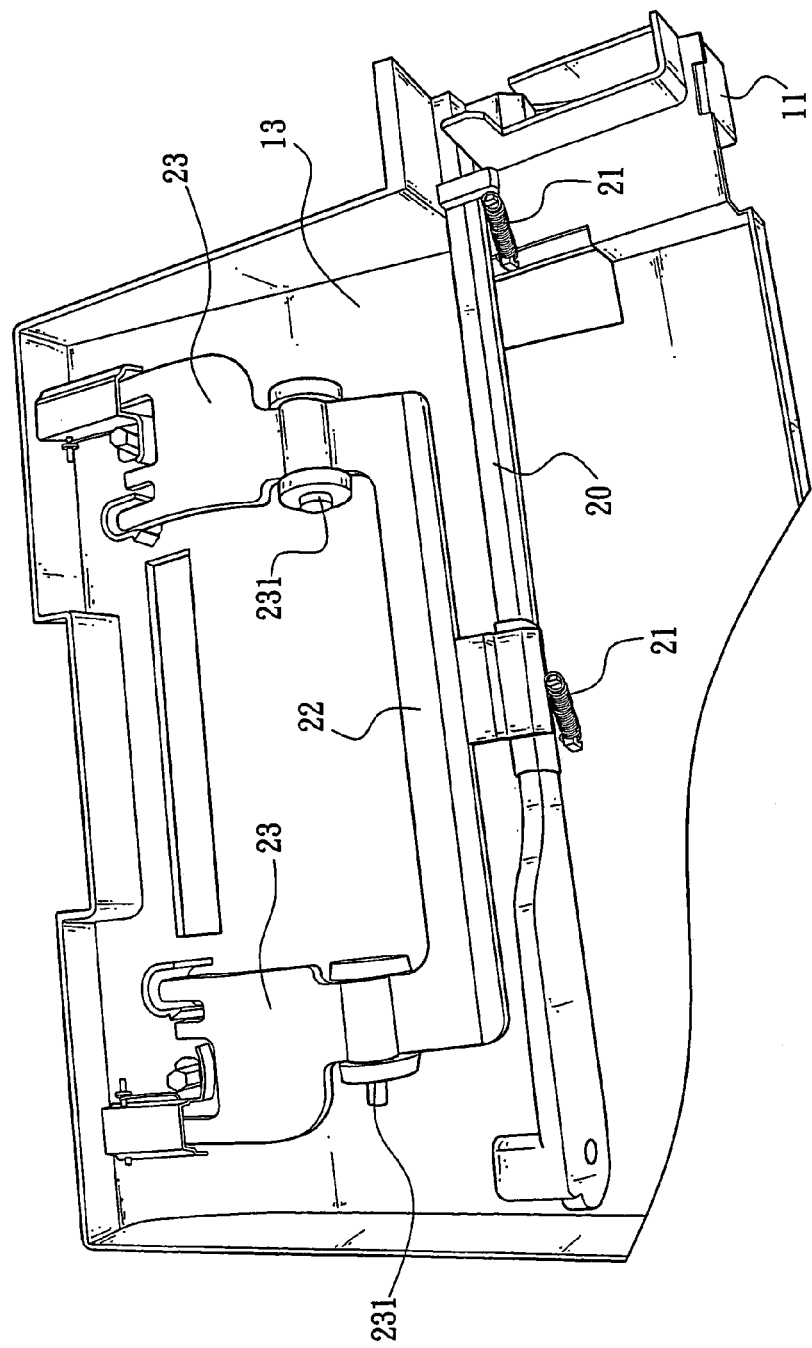
FIG. 3 is a schematic view of the backside of a holder of the docking station according to the present invention.
Figure 4:
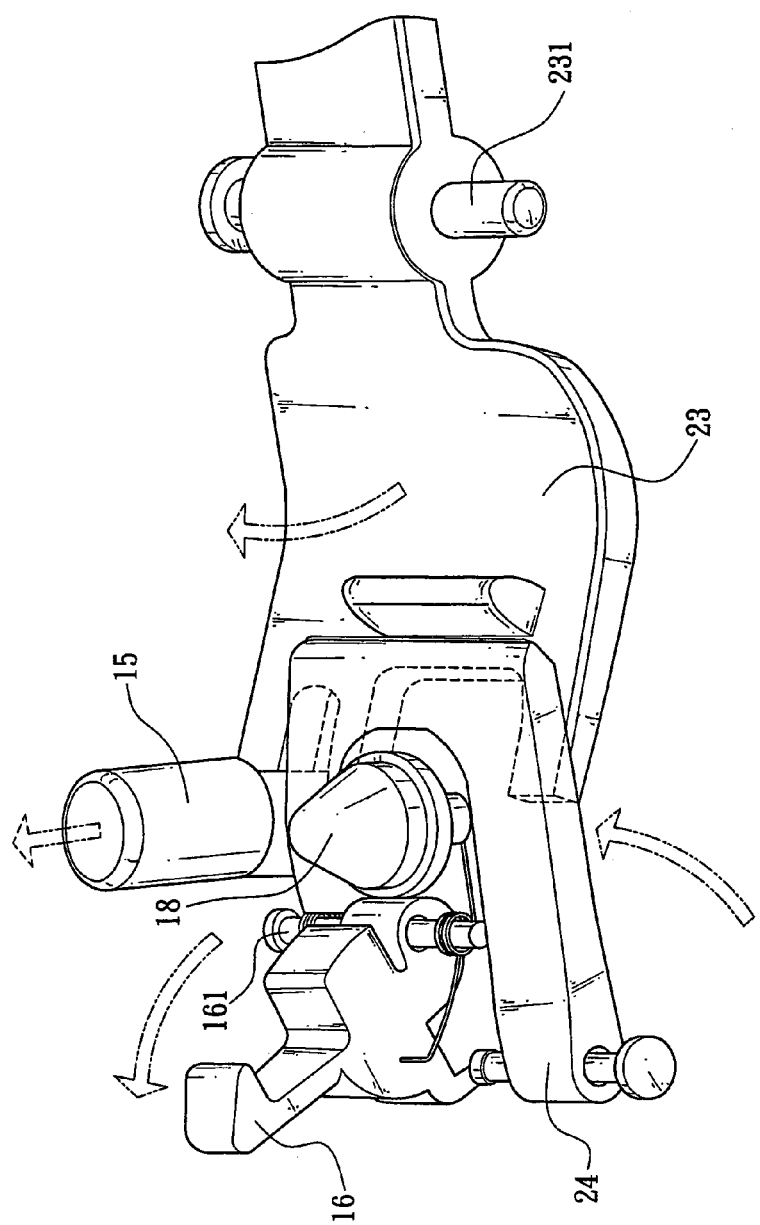
FIG. 4 is a schematic view of a suspending arm, a pillar body and a hook according to the present invention.

Please refer to FIG. 2 for the present invention. A lock core 121 of the lock device 12 has a sliding member 17 held up by a spring 171, so that when the lock core 121 is turned to a close state, it will press against the sliding member 17 to move it to the bottom of the release button 11, such that the release button cannot be pressed any further. The bottom of the release button is connected to a transversal rod, and the transversal rod comprises at least one second spring 21 being held up by the backside of the holder 13. Please refer to FIGS. 2 and 3. The bottom of the transversal rod is connected to a U-shape link rod 22, and the front ends of two corresponding suspending arms 23 of the link rod 22 precisely control the vertical movements of the pillar body 15 and turn the hook 16 outward (as shown in FIG. 4). A pivotal axle 231 pivotally coupled to the backside of the holder 13 is provided for the connection between the two suspending arms 23 and the transversal rod 20, such that when the lock core 121 is turned to a lock state, the sliding member 17 will return to its original position, and the release button 11 will press the transversal rod 20 to drive the link rod 22 and the pivotal axle 231 will drive the two suspending arms 23 to prop the pillar body 15 and turn the hook 16 outward. Therefore, the notebook computer 30 can be separated from the holder 13 easily. With the foregoing locking mechanism, the lock device 12 can lock the release button 11 and prohibit others to take the notebook computer 30 away from the holder 13 after the notebook computer 30 is installed onto the holder 13.

Please refer to FIG. 4 for the present invention. The bottom of the pillar body 15 presses the link rod 22 and the front ends of the two suspending arms 23. The hook 16 is pivotally coupled to a poking rod 24 disposed at the front end of each of the two suspending arms through another pivotal axle 161, such that when the two suspending arms 23 move upward, the pillar body 15 is propped to drive the poking rod 24 and turn the hook 16 outward.

Further, the locking mechanism of the present invention could be combined with other lock devices (such as a cable lock) installed on the body of the docking station 1, such that when the locking mechanism of the lock device 12 and other lock devices are locked, the present invention provides a multiple of effects for preventing others to take away the notebook computer 30 from the docking station 1, or take away the docking station 1 by itself or with the notebook computer.

Please refer to FIG. 1 again for the present invention. The holder 13 has an electromagnetic interference (EMI) resisting device 18 disposed proximate to the pillar body 15, and the notebook computer 30 has a notch 32 being disposed at the bottom of the notebook computer 30 and proximate to the latch hole 33, so that when the notebook computer 30 is installed onto the holder 13, the notch 32 can be aligned precisely with the EMI resisting device 18 to achieve the effect of resisting electromagnetic interference.

In summation of the description above, the locking mechanism of the present invention, not only can lock the notebook computer 30 to the holder 13 of the docking station 1 or release the notebook computer 30 from the holder 13, but also can jointly work with another lock device to lock the docking device 1 itself as to prevent the notebook computer 30 and the docking station 1 from being taken away altogether by others.

While the invention has been described by means of specific embodiments, numerous modifications and variations could be made thereto by those skilled in the art without departing from the scope and spirit of the invention set forth in the claims.

What is claimed is:

1. A docking station for locking a notebook computer, being capable of installing a notebook computer thereon, said docking station comprising:

a body having a release button and a lock device, said release button being controlled by said lock device for a press-down movement; and a holder being protruded from a lateral side of said body and having a connector disposed on said holder, and both ends of said connector having a pillar body with a vertical movement controlled by said release button and an outwardly turnable hook; thereby when said notebook computer is installed onto said holder, another connector and two latch holes disposed on the bottom of said notebook computer are connected precisely onto said connector and engaged onto said hook; and when said release button is pressed, the pillar body props the bottom of said notebook computer while turning said hook outward to be separated from said latch hole;

wherein said lock device comprises:

a sliding member being disposed at a lock core and held up by a first spring for controlling the movement of said sliding member;

a transversal rod, being coupled to the bottom of said release button and having at least one second spring for holding up a backside of said holder;

a link rod, being substantially in a U-shape and coupled to the bottom of said transversal rod, and the front ends of two corresponding suspending arms of said link rod controlling said pillar body and said hook, said two suspending arms and said transversal rod being coupled by a pivotal axle that is pivotally coupled to the backside of said holder, so that said pivotal axle drives said two suspending arms to prop said pillar body as to turn said hook outward.

2. The docking station for locking a note book computer of claim 1, wherein said pillar body with its bottom presses against said link rod and the lateral side of the front ends of said two suspending arms and said hook is pivotally coupled to a poking rod disposed on the lateral side of the front end of said two suspending arms by another pivotal axle.

3. The docking station for locking a notebook computer of claim 1 further comprising other lock devices being coupled with the body of said docking station, such that when said other lock device is locked, said notebook computer and said docking station are locked altogether.

4. The docking station for locking a notebook computer of claim 1, wherein said holder has an electromagnetic interference resisting device disposed proximate to said pillar body, and said notebook computer has a notch disposed on the bottom of said notebook computer at a position proximate to said latch hole.

5. A docking station for locking a notebook computer, being capable of installing a notebook computer thereon, said docking station comprising:
   a body having a release button and a lock device, said release button being controlled by said lock device for a press-down movement; and
   a holder being protruded from a lateral side of said body and having a connector disposed on said holder, and both ends of said connector having a pillar body with a vertical movement controlled by said release button and an outwardly turnable hook; thereby when said notebook computer is installed onto said holder, another connector and two latch holes disposed on the bottom of said notebook computer are connected precisely onto said connector and engaged onto said hook; and when said release button is pressed, the pillar body props the bottom of said notebook computer while turning said hook outward to be separated from said latch hole;
   further comprising other lock devices being coupled with the body of said docking station, such that when said other lock device is locked, said notebook computer and said docking station are locked altogether.

6. A docking station for locking a notebook computer, being capable of installing a notebook computer thereon, said docking station comprising:
   a body having a release button and a lock device, said release button being controlled by said lock device for a press-down movement; and
   a holder being protruded from a lateral side of said body and having a connector disposed on said holder, and both ends of said connector having a pillar body with a vertical movement controlled by said release button and an outwardly turnable hook; thereby when said notebook computer is installed onto said holder, another connector and two latch holes disposed on the bottom of said notebook computer are connected precisely onto said connector and engaged onto said hook; and when said release button is pressed, the pillar body props the bottom of said notebook computer while turning said hook outward to be separated from said latch hole;
   wherein said holder has an electromagnetic interference resisting device disposed proximate to said pillar body, and said notebook computer has a notch disposed on the bottom of said notebook computer at a position proximate to said latch hole.

* * * * *